United States Patent [19]

Roux et al.

[11] Patent Number: 4,709,203

[45] Date of Patent: Nov. 24, 1987

[54] ON BOARD POWER SUPPLY PARTICULARLY FOR A SHIP PROPELLED BY A VARIABLE SPEED DIESEL ENGINE

[75] Inventors: Yves M. J. P. Roux, Rouillac; Patrice G. L. Pitaud, Concarneau, both of France

[73] Assignee: Moteurs Leroy-Somer, Angouleme, France

[21] Appl. No.: 783,427

[22] Filed: Oct. 3, 1985

[30] Foreign Application Priority Data

Oct. 3, 1984 [FR] France ................ 84 15167

[51] Int. Cl.⁴ .......................... H02P 9/30; H02J 9/00
[52] U.S. Cl. .................................. 322/87; 307/84;
290/4 R; 318/158
[58] Field of Search ................ 322/4, 13–16,
322/29, 32, 38–40, 87, 100; 307/84, 87, 57, 78;
310/113; 318/149, 151, 154, 156–158

[56] References Cited

U.S. PATENT DOCUMENTS

| | | | |
|---|---|---|---|
| 1,610,634 | 12/1926 | Thau | 307/78 X |
| 1,681,005 | 8/1928 | Melton | 307/84 |
| 1,840,107 | 1/1932 | Kennedy, Jr. | 290/4 R |
| 2,300,947 | 11/1942 | Liwschitz | 290/4 R |
| 2,911,541 | 11/1959 | Neufville et al. | 290/4 R |
| 3,723,750 | 3/1973 | Dixon et al. | 307/84 X |
| 3,809,996 | 5/1974 | Meisenheimer | 307/57 X |

*Primary Examiner*—R. J. Hickey
*Attorney, Agent, or Firm*—Schweitzer & Cornman

[57] ABSTRACT

The invention relates to an on board power supply, particularily for a ship propelled by a variable speed diesel engine (1), comprising a first alternator (2) coupled to a diesel engine, an electronic regulator (4) for the first alternator, a rectifier (5) for rectifying the output current of the first alternator, a direct current motor (6) powered from the output of the rectifier, and a second alternator (8) coupled to the direct current motor.

It also comprises means (13) for selectively feeding the regulator of the first alternator from the output (12) of the first alternator or from the output (11) of the second alternator.

3 Claims, 1 Drawing Figure

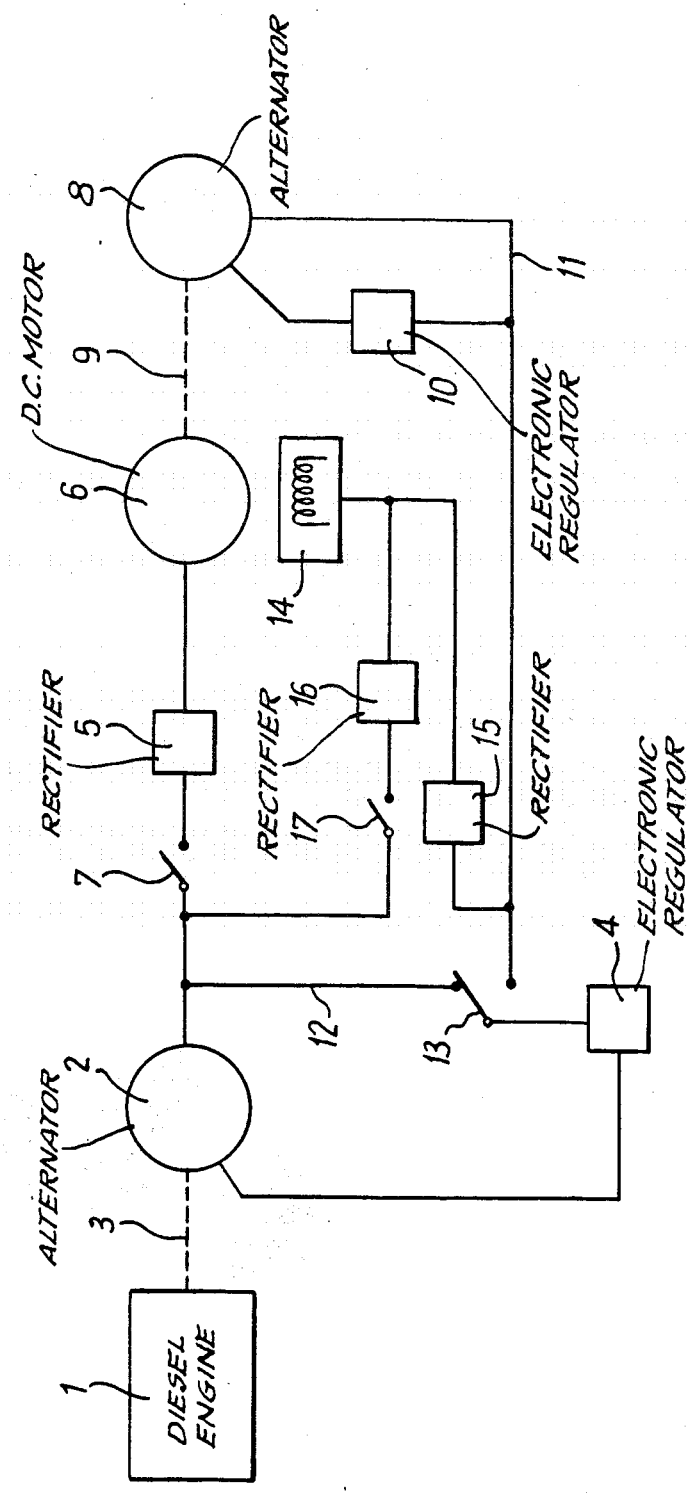

ON BOARD POWER SUPPLY PARTICULARLY FOR A SHIP PROPELLED BY A VARIABLE SPEED DIESEL ENGINE

This invention relates to an on board power supply, particularly for a ship driven by a variable speed diesel engine.

BACKGROUND OF THE INVENTION

Two types of known arrangements are generally used at present on board ships to obtain electrical energy of regulated frequency and voltage.

In a first of these arrangements, the propulsion diesel engine rotates at a fixed speed and a conventional alternator is coupled to the engine. The drive speed of the ship is then controlled by a variable pitch propellor. This causes rapid wear of the motor and has relatively low efficiency.

In another of these arrangements, a variable speed propulsion diesel drives a propellor with fixed blades, and the use of a continuously running generating set is then indispensable.

In order to overcome the disadvantages of these arrangements, it has been proposed to use an on board power supply including a first alternator coupled to the diesel engine, an electronic regulator for the first alternator, a rectifier to rectify the current output of the of the first alternator, a direct current motor powered from the output of the rectifier, and a second alternator driven by the direct current motor.

These arrangements are not by themselves entirely satisfactory, since the rectifier sends back upstream to the first alternator, harmonics which cause poor regulation of the alternator. In addition, this regulation is influenced to a certain extent by the accelerations and deceleration of the diesel motor which drives the first alternator. Under these conditions, it is difficult to maintain the output current of the second alternator within an acceptable range of frequency and voltage.

The present invention overcomes these disadvantages.

SUMMARY OF THE INVENTION

The present invention has for an object, an on board power supply, particularly for a ship or vessel powered by a variable speed diesel engine, and comprised of a first alternator coupled to the diesel engine, an electronic regulator for the first alternator, a rectifier to rectify the current output of the of the first alternator, a direct current motor powered from the output of the rectifier, and a second alternator driven by the direct current motor, and which also comprises means for selective regulation of the first alternator from the output of the first alternator or from the output of the second alternator.

It is to be understood that the regulator of the first alternator is not fed from its own output after the starting phase. It is only in this phase that it will be affected by the variations of speed of rotation of the propulsion diesel engine and by the harmonics sent back by its rectifier.

At the end of the start phase the power feed to the regulator will be switched to the output of the second alternator, which is perfectly sinusoidal, and is not affected by variations of speed of the diesel propulsion engine.

In one particular embodiment of the invention, the on board power supply according to the invention comprises means for selectively energising the windings of the direct current motor from the output of the first alternator or from the output of the second alternator.

In this way, not only the regulator of the first alternator, but also the direct current motor, will not be affected during the phase start by the imperfections of the output of the first alternator.

The means for selectively feeding the windings of the direct current motor can comprise a first rectifier whose input is connected to the output of the first alternator through a switcher or interrupter, and a second rectifier whose input is connected to the output of the second alternator, the outputs of the two rectifiers being connected in parallel across the terminals of the windings.

A non limiting example of an embodiment of the invention will now be described with reference to the accompanying drawing.

BRIEF DESCRIPTION OF THE DRAWING

The drawing shows schematically, an on board power supply, according to the invention.

DETAILED DESCRIPTION

The on board power supply according to the invention is installed in a ship or vessel driven by a variable speed diesel propulsion engine 1, which permits the use of a fixed blade propellor.

A first alternator 2 is coupled by conventional means 3 to the diesel engine 1, and is regulated by an electronic regulator 4.

The output of the alternator 2 is rectified by a bridge rectifier 5, and the output of the bridge rectifier 5 is fed to a direct current motor 6. A switch or interrupter 7 is located between the output of the alternator 2 and the input of the rectifier 5.

A second alternator 8 is mechanically coupled by conventional coupling means 9 to direct current motor 6, and is regulated by an electronic regulator 10.

The electronic regulator 10 of the alternator 8 is directly connected to the output 11 of the alternator 8, while the regulator 4 of the alternator 2 can be fed selectively from the output 12 of the alternator 2, or from the output 11 of the alternator 8. A switch 13 is connected to the input line of the regulator to switch between the output 11 and the ouput 12.

With regard to the direct current motor 6, its winding 14 is connected to the output 11 of the alternator 8 through a rectifier 15, and to the output 12 of the alternator 2 through a rectifier 16 and a switch or interrupter 17.

The power supply is started as follows.

The diesel motor is started and its speed is set at a level to permit auto-energization of the alternator 2. During this auto-energization, the regulator 4 is fed from the output 12 of the alternator 2, the switch 13 being in the position shown on the drawing to connect the regulator to the output 12. The regulator maintains the voltage of the stator of the alternator 2 essentially constant. The switches 7 and 17 are then closed to power the direct current motor 6 from the output of the alternator 2. During this phase, the alternator 8, driven by the direct current motor 6, is auto-energized and delivers its normal voltage. A part of this voltage is fed back to the output 11 to feed the winding of motor 6 such that the power to this winding from the output of alternator 2 can be disconnected by opening the switch 17.

Then, switch 13 is thrown, which causes the power to the regulator 4 of alternator 2 to flow from the output of the alternator 8.

Thus, the regulation of the alternator 2 is very little affected by the variations of speed of this latter. It avoids also by this means the harmonics of current created in the alternator 2 by the presence of the bridge rectifier 5, without using harmonic filters.

It is to be understood that various changes and modifications can be made in the preceeding description without departing from the scope and spirit of the invention.

We claim:

1. On board electrical power supply, for a ship or vessel powered by a variable speed diesel engine comprising, a first alternator coupled to the diesel engine, an electronic regulator for the first alternator, a rectifier for rectifying the output current of the first alternator, a direct current motor powered from the output of the rectifier, a second alternator coupled to the direct current motor, and means for selectively powering the regulator of the first alternator from the output of the first alternator or from the output of the second alternator.

2. On board power supply according to claim 1 comprising, means for selectively feeding windings of the direct current motor from the output of the first alternator or from the output of the second alternator.

3. On board power supply according to claim 2, wherein said means for selectively feeding the windings of the direct current motor comprise a first rectifier whose input is connected to the output of the first alternator through a switch, and a second rectifier whose input is connected to the output of the second alternator, the outputs of the two alternators being connected in parallel to the terminals of the windings.

* * * * *